(12) United States Patent
Matsushita

(10) Patent No.: US 12,507,869 B2
(45) Date of Patent: Dec. 30, 2025

(54) MOUNTING DEVICE FOR ELASTIC TUBULAR MEMBER AND MOUNTING METHOD FOR ELASTIC TUBULAR MEMBER

(71) Applicant: FUJIFILM Corporation, Tokyo (JP)

(72) Inventor: Motohiko Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 277 days.

(21) Appl. No.: 18/359,851

(22) Filed: Jul. 26, 2023

(65) Prior Publication Data

US 2024/0032775 A1 Feb. 1, 2024

(30) Foreign Application Priority Data

Jul. 28, 2022 (JP) ................... 2022-120335

(51) Int. Cl.
*A61B 1/00* (2006.01)
*A61M 25/10* (2013.01)
(Continued)

(52) U.S. Cl.
CPC ........ *A61B 1/0011* (2013.01); *A61B 1/00082* (2013.01); *B25B 27/146* (2013.01); *A61M 25/1034* (2013.01); *B25B 27/28* (2013.01)

(58) Field of Classification Search
CPC ......... Y10T 29/53657; Y10T 29/53722; Y10T 29/53896; Y10T 29/539; Y10T 29/53909; Y10T 29/53917; Y10T 29/53961; Y10T 29/53987; Y10T 29/53996; B25B 11/02; B25B 27/146; B25B 27/28;
(Continued)

(56) References Cited

U.S. PATENT DOCUMENTS 2,594,432 A * 4/1952 Henry ................... B21D 53/44
29/8
2,600,163 A * 6/1952 Henry ................... B21D 53/44
29/8
(Continued)

FOREIGN PATENT DOCUMENTS

EP 2594310 A1 * 5/2013 ........... A61B 1/0011
EP 2594310    3/2016
JP 2013126526    6/2013

*Primary Examiner* — Tyrone V Hall, Jr.
(74) *Attorney, Agent, or Firm* — JCIPRNET

(57) ABSTRACT

A mounting device for an elastic tubular member includes a movable sleeve holding member, and arms each of which has one end swingably fixed to the movable sleeve holding member. The other end of each arm has a receiving portion whose state changes between a diameter-reduced state and a diameter-expanded state due to swinging of the arm. The movable sleeve includes a flange portion which constitutes a distal end surface, and includes pushing portions having different heights in a pushing direction. The receiving portions becomes the diameter-reduced state to mount the elastic tubular member on the receiving portions, and the receiving portions becomes the diameter-expanded state to expand the diameter of the elastic tubular member. By moving the movable sleeve after the diameter is expanded, the pushing portions disengage the rubber band from the receiving portions, and the elastic tubular member is mounted to an endoscope insertion portion.

17 Claims, 14 Drawing Sheets

(51) Int. Cl.
*B25B 27/14* (2006.01)
*B25B 27/28* (2006.01)

(58) Field of Classification Search
CPC ............ A61B 1/00087; A61B 1/00101; A61B 1/00135; A61B 1/0014; A61B 1/0011; A61B 1/00082; A61M 25/1034
See application file for complete search history.

(56) References Cited

U.S. PATENT DOCUMENTS

| | | | | |
|---|---|---|---|---|
| 5,261,918 A | * | 11/1993 | Phillips | A61B 17/29 606/1 |
| 6,049,960 A | * | 4/2000 | Pilling | H02G 1/14 29/450 |
| 2020/0305694 A1 | * | 10/2020 | Takahashi | A61B 1/0055 |

* cited by examiner

MOUNTING DEVICE FOR ELASTIC TUBULAR MEMBER AND MOUNTING METHOD FOR ELASTIC TUBULAR MEMBER

CROSS-REFERENCE TO RELATED APPLICATION

The present application claims priority under 35 U.S.C § 119(a) to Japanese Patent Application No. 2022-120335 filed on Jul. 28, 2022, which is hereby expressly incorporated by reference, in its entirety, into the present application.

BACKGROUND OF THE INVENTION

1. Field of the Invention

The present invention relates to a mounting device for an elastic tubular member and a mounting method for an elastic tubular member.

2. Description of the Related Art

A balloon that inflates and deflates is used in various applications in an endoscopic device. For example, in a case of using an endoscopic device for observing a deep alimentary canal such as a small intestine or a large intestine, an inflatable and deflatable balloon is mounted to an endoscope insertion portion or an endoscope insertion assisting tool (a sliding tube, an overtube, or the like). By inflating the balloon, the endoscope insertion portion or the insertion assisting tool is fixed in the body. In addition, in an ultrasound inspection apparatus, an inflatable and deflatable balloon is used to surround an ultrasound scanning portion at a distal end of an ultrasound probe and is filled with an ultrasound transmission medium.

Such a balloon is formed of an elastic body such as rubber, and an end portion thereof is formed in a tubular shape having a diameter smaller than an outer diameter of an attachment target (a rod-like body such as an endoscope insertion portion or an insertion assisting tool) in a natural state. Therefore, in a case of mounting the balloon, the end portion of the balloon is fixed to the attachment target by covering the attachment target while expanding the diameter of the end portion of the balloon, and then expanding a diameter of a rubber band to externally fit the rubber band to the end portion of the balloon.

A mounting device for attaching an elastic tubular member such as a balloon or a rubber band to a rod-like body such as an endoscope insertion portion is known. For example, a mounting device for an elastic tubular member of JP2013-126526A includes a movable sleeve, a holding member that holds the movable sleeve, and a plurality of arms each having one end fixed to the holding member so as to be swingable. The other end of each of the plurality of arms is provided with a receiving portion whose state changes between a diameter-reduced state and a diameter-expanded state due to swinging of the arm. In this mounting device, the receiving portion is brought into a diameter-reduced state by swinging the arm, and the rubber band is mounted on the receiving portion. Next, the receiving portion is brought into a diameter-expanded state by swinging the arm so that a diameter of the rubber band is expanded by the receiving portion. By moving the movable sleeve after the diameter of the rubber band is expanded, the rubber band is slid from the receiving portion by a distal end surface of the movable sleeve. The rubber band is disengaged from the receiving portion, and the rubber band is mounted to the endoscope insertion portion.

SUMMARY OF THE INVENTION

However, in a case where the distal end surface of the movable sleeve is slid such that the elastic tubular member is disengaged from the receiving portion, the elastic tubular member may be twisted or may not be stably disengaged from the receiving portion. Therefore, it has been desired that the elastic tubular member can be reliably mounted to the rod-like body.

The present invention has been made in view of such circumstances, and an object of the present invention is to provide a mounting device for an elastic tubular member and a mounting method for an elastic tubular member, which are capable of suppressing twisting of the elastic tubular member and stably disengaging the elastic tubular member from receiving portions.

A mounting device for an elastic tubular member according to a first aspect expands a diameter of the elastic tubular member larger than an outer diameter of a rod-like body as an attachment target to mount the elastic tubular member on the rod-like body from an outside, the mounting device comprising: a movable sleeve into which the rod-like body is capable of being inserted; a movable sleeve holding member that movably holds the movable sleeve in an axial direction; three or more arms, which are arranged on an outer periphery of the movable sleeve apart from each other in a circumferential direction and parallel to the axial direction and of which one end portion is attached to the movable sleeve holding member such that the arms are swingable in a radial direction of the movable sleeve; receiving portions each formed on the other end portion of each arm, which receive an inner peripheral surface of the elastic tubular member and are brought into a diameter-reduced state in which the elastic tubular member is capable of being set and a diameter-expanded state in which the elastic tubular member is capable of being mounted to the rod-like body due to swinging of the arms; a flange portion that is provided on a distal end side of the movable sleeve into which the rod-like body is inserted and that forms a distal end surface of the movable sleeve and allows passage of the arms; three or more pushing portions for pushing the elastic tubular member, the pushing portion being formed on the distal end surface for each of positions of the arms, and at least one pushing portion having a height in a pushing direction different from that of the other pushing portion; and a shift mechanism that moves the movable sleeve relative to the movable sleeve holding member to swing the arm by engagement between the movable sleeve and the arm, brings the receiving portions into the diameter-expanded state from the diameter-reduced state, and thereafter pushes the elastic tubular member from the receiving portions by the pushing portions in order of the heights of the pushing portions.

In the mounting device for an elastic tubular member according to a second aspect, the three or more pushing portions all have different heights in the pushing direction.

In the mounting device for an elastic tubular member according to a third aspect, the three or more pushing portions are disposed in order of the heights along a circumferential direction of the flange portion.

In the mounting device for an elastic tubular member according to a fourth aspect, a groove portion defined by the flange portion and extending in a radial direction of the flange portion allows passage of the arm.

In the mounting device for an elastic tubular member according to a fifth aspect, the pushing portion is composed of a pair of individual pushing portions disposed on both sides of the groove portion.

In the mounting device for an elastic tubular member according to a sixth aspect, the three or more arms are composed of four arms, and the three or more pushing portions are composed of four pushing portions.

In the mounting device for an elastic tubular member according to a seventh aspect, the four pushing portions are composed of two types of pushing portions in which only one pushing portion has a different height in the pushing direction from other three pushing portions.

In the mounting device for an elastic tubular member according to an eighth aspect, the four pushing portions are composed of three types of pushing portions in which one pushing portion, two other pushing portions, and a remaining one pushing portion have different heights in the pushing direction.

In the mounting device for an elastic tubular member according to a ninth aspect, the four pushing portions are composed of two types of pushing portions in which two pushing portions have different heights in the pushing direction from other two pushing portions.

In the mounting device for an elastic tubular member according to a tenth aspect, among the four pushing portions, the two pushing portions are disposed side by side in a circumferential direction, and the other two pushing portions are disposed in the circumferential direction.

In the mounting device for an elastic tubular member according to an eleventh aspect, the four pushing portions are alternately disposed in order of different heights along a circumferential direction of the flange portion.

In the mounting device for an elastic tubular member according to a twelfth aspect, the four pushing portions all have different heights in the pushing direction.

In the mounting device for an elastic tubular member according to a thirteenth aspect, the four pushing portions are disposed in order of the heights along the circumferential direction of the flange portion.

In the mounting device for an elastic tubular member according to a fourteenth aspect, the rod-like body is an endoscope insertion portion, and the elastic tubular member is a balloon or a rubber band for attaching the balloon to be attached to the endoscope insertion portion.

In the mounting device for an elastic tubular member according to a fifteenth aspect, the arm has at the one end portion thereof a swing restricting protrusion that comes into contact with an outer peripheral surface of the movable sleeve to restrict swing, and the movable sleeve has a peripheral protrusion portion on which the swing restricting protrusion rides to bring the receiving portion into the diameter-reduced state.

In the mounting device for an elastic tubular member according to a sixteenth aspect, the flange portion and the three or more pushing portions are composed of an integrally molded product.

A mounting method for an elastic tubular member according to a seventeenth aspect expands a diameter of the elastic tubular member larger than an outer diameter of a rod-like body as an attachment target to mount the elastic tubular member on the rod-like body from an outside, the method comprising: by using a mounting device for an elastic tubular member including: a movable sleeve into which the rod-like body is capable of being inserted; a movable sleeve holding member that movably holds the movable sleeve in an axial direction; three or more arms, which are arranged on an outer periphery of the movable sleeve apart from each other in a circumferential direction and parallel to the axial direction and of which one end portion is attached to the movable sleeve holding member such that the arms are swingable in a radial direction of the movable sleeve; receiving portions each formed on the other end portion of each arm, which receive an inner peripheral surface of the elastic tubular member and are brought into a diameter-reduced state in which the elastic tubular member is capable of being set and a diameter-expanded state in which the elastic tubular member is capable of being mounted to the rod-like body due to swinging of the arms; a flange portion that is provided on a distal end side of the movable sleeve into which the rod-like body is inserted and that forms a distal end surface of the movable sleeve and allows passage of the arms; and three or more pushing portions for pushing the elastic tubular member, the pushing portion being formed on the distal end surface for each of positions of the arms, and at least one pushing portion having a height in a pushing direction different from that of the other pushing portion, moving the movable sleeve relative to the movable sleeve holding member to swing the arm by engagement between the movable sleeve and the arm, bringing the receiving portions into the diameter-expanded state from the diameter-reduced state, and thereafter pushing the elastic tubular member from the receiving portions by the pushing portions in order of the heights of the pushing portions.

According to the aspects of the present invention, twisting of the elastic tubular member can be suppressed, and the elastic tubular member can be stably disengaged from the receiving portions.

DESCRIPTION OF THE PREFERRED EMBODIMENTS

Hereinafter, a mounting device for an elastic tubular member and a mounting method for the elastic tubular member according to embodiments of the present invention will be described with reference to the accompanying drawings.

Overall Configuration of Mounting Device for Elastic Tubular Member

Figure 1:
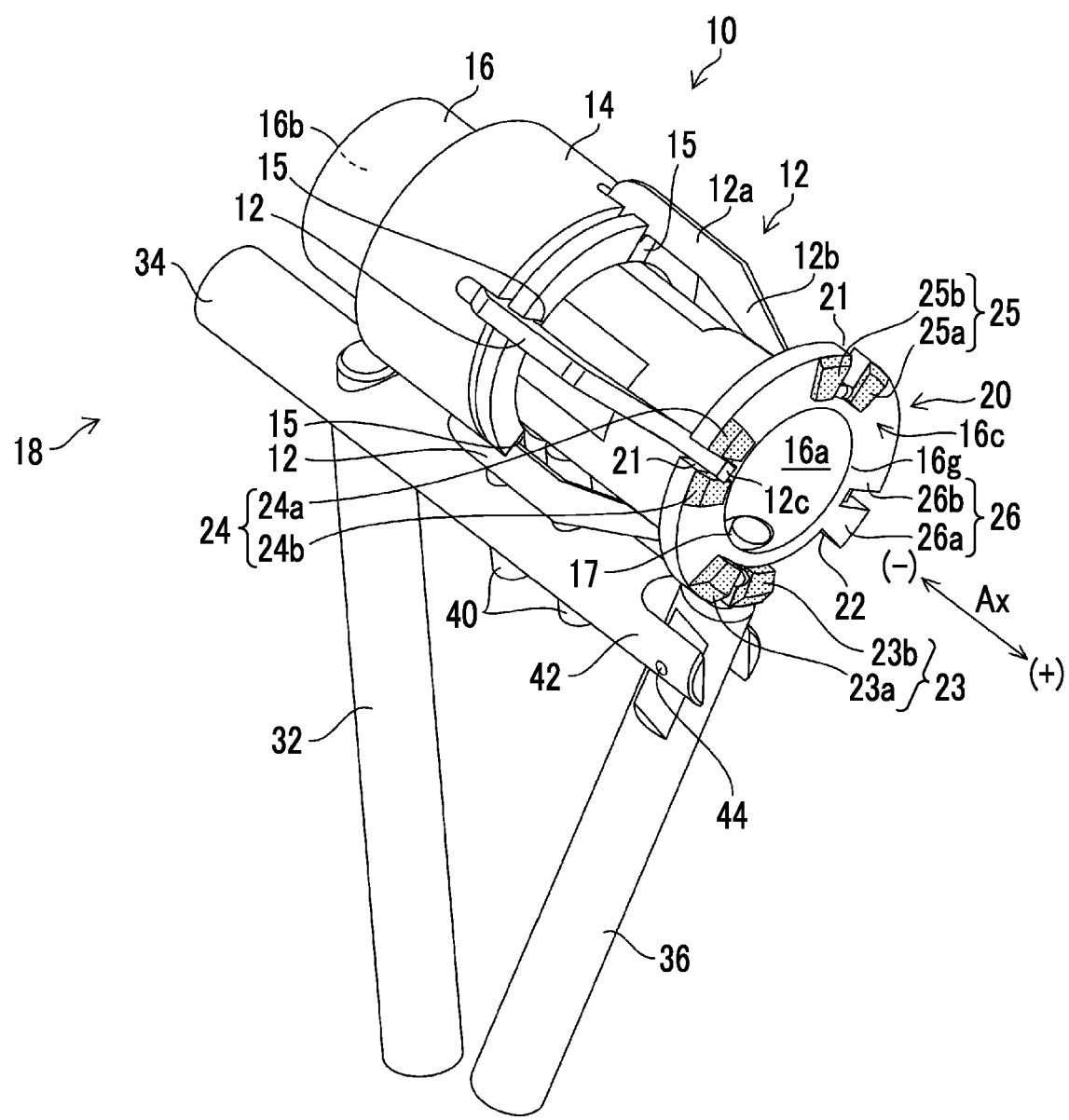
FIG. 1 is a perspective view showing a first state of a mounting device for an elastic tubular member.
Figure 2:
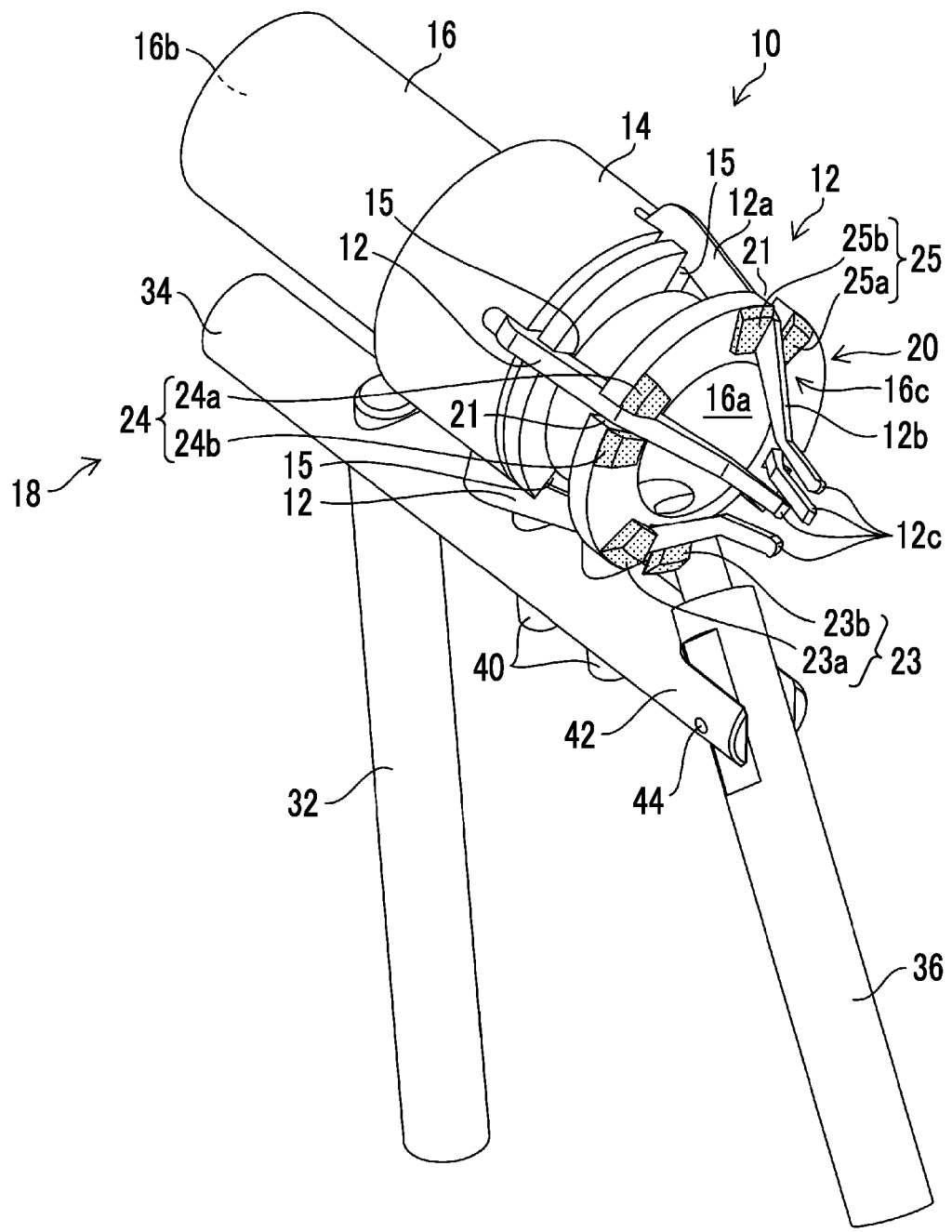
FIG. 2 is a perspective view showing a second state of the mounting device for the elastic tubular member.
Figure 3:
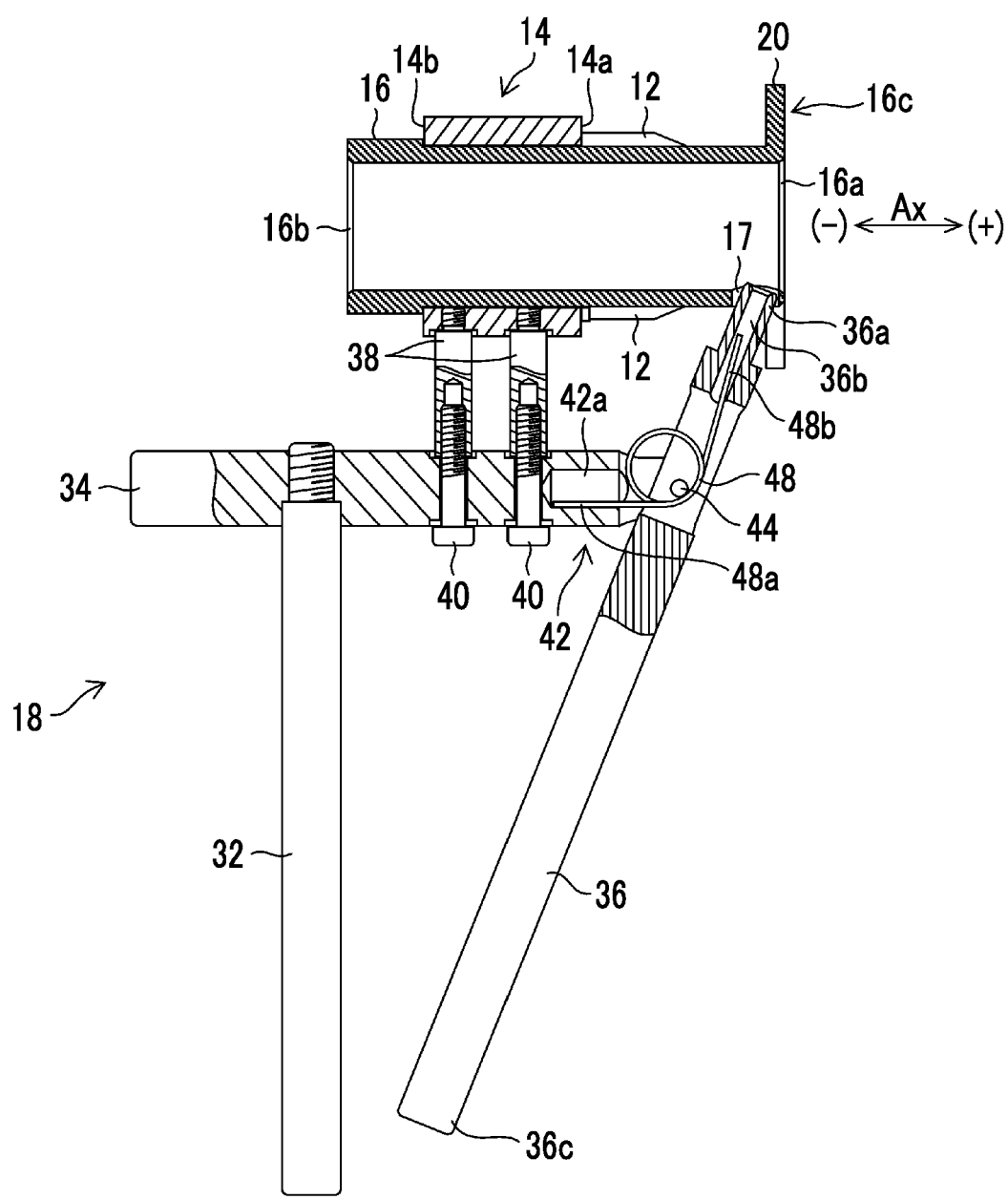
FIG. 3 is a vertical cross-sectional view of the mounting device for the elastic tubular member of FIG. 1.

FIGS. 1 and 2 are overall perspective views of a mounting device for an elastic tubular member according to the embodiment. FIG. 3 is a vertical cross-sectional view of a mounting device 10 in a state of FIG. 1. The mounting device 10 for the elastic tubular member (hereinafter, simply referred to as a mounting device) includes four arms 12, an arm holding boss 14, a movable sleeve 16, a grip 18, and a flange portion 20. As shown in FIG. 2, a receiving portion 12c is formed on the arm 12. The arm holding boss 14 is an example of a movable sleeve holding member of the present invention.

FIG. 1 shows the mounting device 10 in a first state, and in the mounting device 10 in the first state, the receiving portions 12c of the four arms 12 are in a diameter-expanded state. On the other hand, FIG. 2 shows the mounting device 10 in a second state, and in the mounting device 10 in the second state, the receiving portions 12c of the four arms 12 are in a diameter-reduced state.

The arm holding boss 14 is formed of a cylindrical body. An outer peripheral surface of the arm holding boss 14 and openings 14a and 14b at both ends (see FIG. 3) are defined by the cylindrical body. The opening 14a and the opening 14b of the arm holding boss 14 communicate with each other. Four arm holding grooves 15 are formed in the arm holding boss 14 in a radial direction. The arm holding grooves 15 are disposed at intervals of 90 degrees in a circumferential direction. The arm 12 is movably inserted into the arm holding groove 15. In this example, a (+) side in an axial direction Ax of the arm holding boss 14 will be described as a distal end side into which the rod-like body is inserted, and a (−) side of the axial direction Ax will be described as a proximal end side. Therefore, the opening 14a is located on the distal end side of the arm holding boss 14, and the opening 14b is located on the proximal end side of the arm holding boss 14. The arm holding boss 14 is an example of a movable sleeve holding member of the present invention.

The four arms 12 are arranged at intervals of 90 degrees in a circumferential direction of an outer periphery of the arm holding boss 14 and in parallel with the axial direction Ax of the arm holding boss 14. The arm 12 is formed of an elongated strip-shaped metal plate. The arm 12 is attached to the arm holding boss 14 at one end portion thereof so as to be swingable in a radial direction of the movable sleeve 16. The arm 12 includes an arm body portion 12a, an arm intermediate portion 12b, and a receiving portion 12c. The arm body portion 12a and the receiving portion 12c are substantially parallel to each other and located at positions separated from each other. The arm intermediate portion 12b connects the arm body portion 12a and the receiving portion 12c, and the arm 12 has a crank shape as a whole. One end portion of the arm 12 (a proximal end side of the arm 12) is attached to the arm holding boss 14. The receiving portion 12c is located at the other end portion of the arm 12 to constitute a free end and is capable of being expanded and reduced in diameter thereof. The arm 12 is swingable in a radial direction of the movable sleeve 16.

The movable sleeve 16 is formed of a cylindrical body having an outer diameter smaller than an inner diameter of the arm holding boss 14. The cylindrical body defines an outer peripheral surface of the movable sleeve 16 and openings 16a and 16b at both ends. The opening 16a and the opening 16b of the movable sleeve 16 communicate with each other. The opening 16a on a distal end side of the movable sleeve 16 allows the rod-like body to be inserted. The movable sleeve 16 is held by the arm holding boss 14 so as to be movable in the axial direction Ax of the arm holding boss 14.

The movable sleeve 16 is provided with a flange portion 20 that forms a distal end surface 16c of the movable sleeve 16 on the distal end side into which a rod-like body is inserted. The distal end surface 16c is a surface located on the distal end side of the movable sleeve 16. The flange portion 20 is a substantially disk-shaped member that surrounds a periphery of the opening 16a. In this example, the flange portion 20 and the movable sleeve 16 are composed of an integrally molded product. The flange portion 20 and the movable sleeve 16 may be formed as separate bodies, and the flange portion 20 and the movable sleeve 16 may be bonded to each other.

The four groove portions 21 are defined by the flange portion 20 and allow passage of the four arms 12. The groove portion 21 penetrates the flange portion 20 in the axial direction Ax and extends in a radial direction. The groove portion 21 of this example is open to the outside in a radial direction of the flange portion 20. Since the groove portion 21 is open on the outside in the radial direction, the flange portion 20 can be easily machined. As long as the passage of the four arms 12 can be allowed, a hole portion of which an outer side in the radial direction is not open may be formed in the flange portion 20 instead of the groove portion 21. Further, an engagement hole 17 penetrating the movable sleeve 16 is formed at an intermediate position between two groove portions 21 in a circumferential direction. An operation lever 36, which will be described later, is inserted into the engagement hole 17.

The flange portion 20 does not have to completely surround the periphery of the opening 16a. In this example, a cutout 22 is formed in a part of the flange portion 20 in order to avoid interference with the operation lever 36 described later. In addition, a plurality of cutouts 22 may be formed in the flange portion 20.

Four pushing portions 23, 24, 25, and 26 are each formed on the distal end surface 16c at each position of the four arms 12. The four pushing portions 23, 24, 25, and 26 are members for pushing the elastic tubular member from the arm 12, as will be described later, and are each provided with a flat surface for pushing the elastic tubular member on the distal end side. In this example, the four pushing portions 23, 24, 25, and 26 have different heights in a pushing direction (referred to as "pushing height"). The pushing height is a distance from a peripheral edge surface 16g of the opening 16a to the flat surfaces of the pushing portions 23, 24, 25, and 26, and can be represented as a distance at a position where the elastic tubular member comes into contact with the pushing portions 23, 24, 25, and 26. Among the four pushing portions 23, 24, 25, and 26, the pushing portion 23 has the highest pushing height, and the pushing portion 24, the pushing portion 25, and the pushing portion 26 are decreased in pushing height in this order. That is, the four pushing portions 23, 24, 25, and 26 are disposed in order of the pushing height in a circumferential direction of the flange portion 20. In order to facilitate understanding of structures of the pushing portions 23, 24, and 25, the pushing portions 23, 24, and 25 are displayed in a color pattern different from that of the flange portion 20.

Each of the pushing portions 23, 24, and 25 protrudes from the peripheral edge surface 16g and has a substantially cubic shape having different pushing heights to the flat surface. On the other hand, the flat surface of the pushing portion 26 is formed to be flush with the peripheral edge surface 16g. The pushing height includes a case of protruding to the distal end side with reference to the peripheral edge surface 16g and a case of coinciding with the peripheral edge surface 16g.

In this example, the pushing portion 23 is composed of a pair of individual pushing portions 23a and 23b separated by the groove portion 21. The pushing heights of the pair of individual pushing portions 23a and 23b are basically set to the same height. Similarly, the pushing portion 24 is composed of a pair of individual pushing portions 24a and 24b having the same pushing height, the pushing portion 25 is composed of a pair of individual pushing portions 25a and 25b having the same pushing height, and the pushing portion 26 is composed of a pair of individual pushing portions 26a and 26b having the same pushing height. The operations of the pushing portions 23, 24, 25, and 26 will be described later.

The grip 18 includes a first rod member 32, a second rod member 34, and the operation lever 36. The first rod member 32 and the second rod member 34 are fixed in a positional relationship that is substantially orthogonal to each other. A male screw provided at one end of the first rod member 32 is fastened to a female screw provided on the second rod member 34. The first rod member 32, the second rod member 34, and the operation lever 36 are formed in a substantially cylindrical shape.

The grip 18 includes two support members 38, and one end of each of the two support members 38 is fixed to the second rod member 34 by an attachment screw 40. The two support members 38 are substantially orthogonal to the second rod member 34 and extend to a side opposite to the first rod member 32 with the second rod member 34 interposed therebetween.

The two support members 38 are fixed to the outer peripheral surface of the arm holding boss 14 by screwing. A relative positional relationship between the grip 18 and the arm holding boss 14 is determined by this fixing. The axial direction Ax of the arm holding boss 14 and a longitudinal direction of the second rod member 34 are substantially parallel to each other.

The second rod member 34 is provided with a bifurcated attachment portion 42 on the other end side (distal end side) on a side opposite to the first rod member 32. The attachment portion 42 comprises an attachment shaft 44. The operation lever 36 is rotatably supported by the attachment shaft 44 of the attachment portion 42.

The operation lever 36 has a distal end portion 36a on one end side. The distal end portion 36a is formed in a stepped cylinder having a smaller diameter than that of the other portion. The distal end portion 36a is inserted into the engagement hole 17 of the movable sleeve 16.

A torsion spring 48 is attached to the attachment portion 42 of the second rod member 34. In this example, an end portion 48a of the torsion spring 48 is locked to a spring locking hole 42a of the attachment portion 42, and the other end portion 48b is locked to a spring locking hole 36b of the distal end portion 36a of the operation lever 36. The torsion spring 48 urges the end portion 48a and the end portion 48b in a direction in which they are separated from each other. The torsion spring 48 urges the distal end portion 36a of the operation lever 36 toward the distal end side. The operation lever 36 rotates about the attachment shaft 44 by an urging force, and the distal end portion 36a moves toward the distal end side with respect to the movable sleeve 16. Due to the movement of the distal end portion 36a, the movable sleeve 16 moves toward the distal end side with respect to the arm holding boss 14. Accordingly, in this example, in a case where the operation lever 36 is not operated, as shown in FIG. 1, the receiving portion 12c of the arm 12 is in the diameter-expanded state and is in the first state of the mounting device 10. The first state is an initial state of the mounting device 10.

On the other hand, in a case where the operation lever 36 is operated and a rear end portion 36c on a side opposite to the distal end portion 36a is moved to the distal end side, the operation lever 36 rotates about the attachment shaft 44. The distal end portion 36a moves to the proximal end side relative to the movable sleeve 16. By the movement of the distal end portion 36a, the movable sleeve 16 moves to the proximal end side with respect to the arm holding boss 14. In a case where the operation lever 36 is operated, as shown in FIG. 2, the receiving portion 12c of the arm 12 is in the diameter-reduced state and is in the second state of the mounting device 10.

The grip 18 including the first rod member 32, the second rod member 34, and the operation lever 36, and the torsion spring 48 are examples of a shift mechanism of the present invention, and the present invention is not limited to this configuration.

Figure 4:
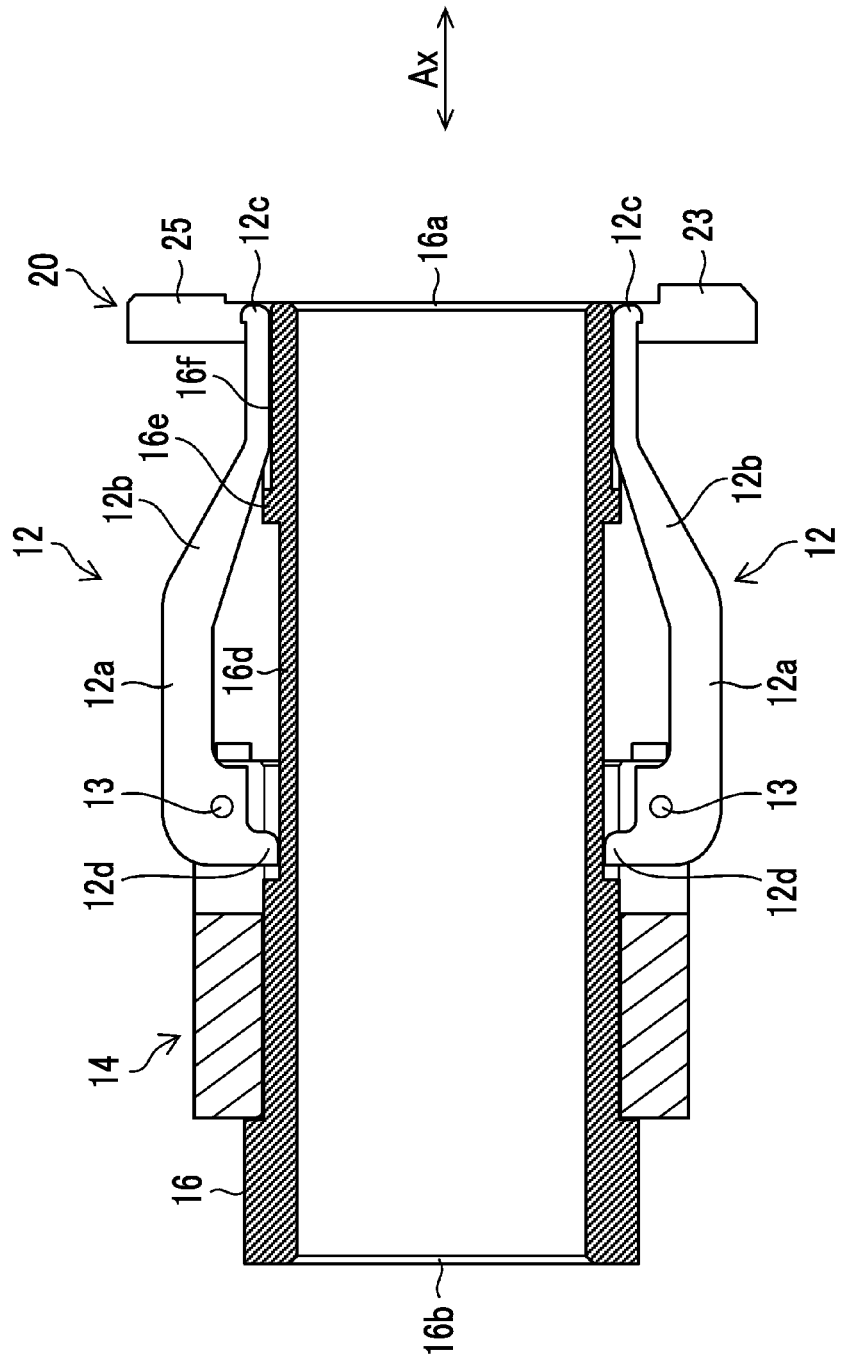
FIG. 4 is a cross-sectional view showing an arm in a first state.
Figure 5:
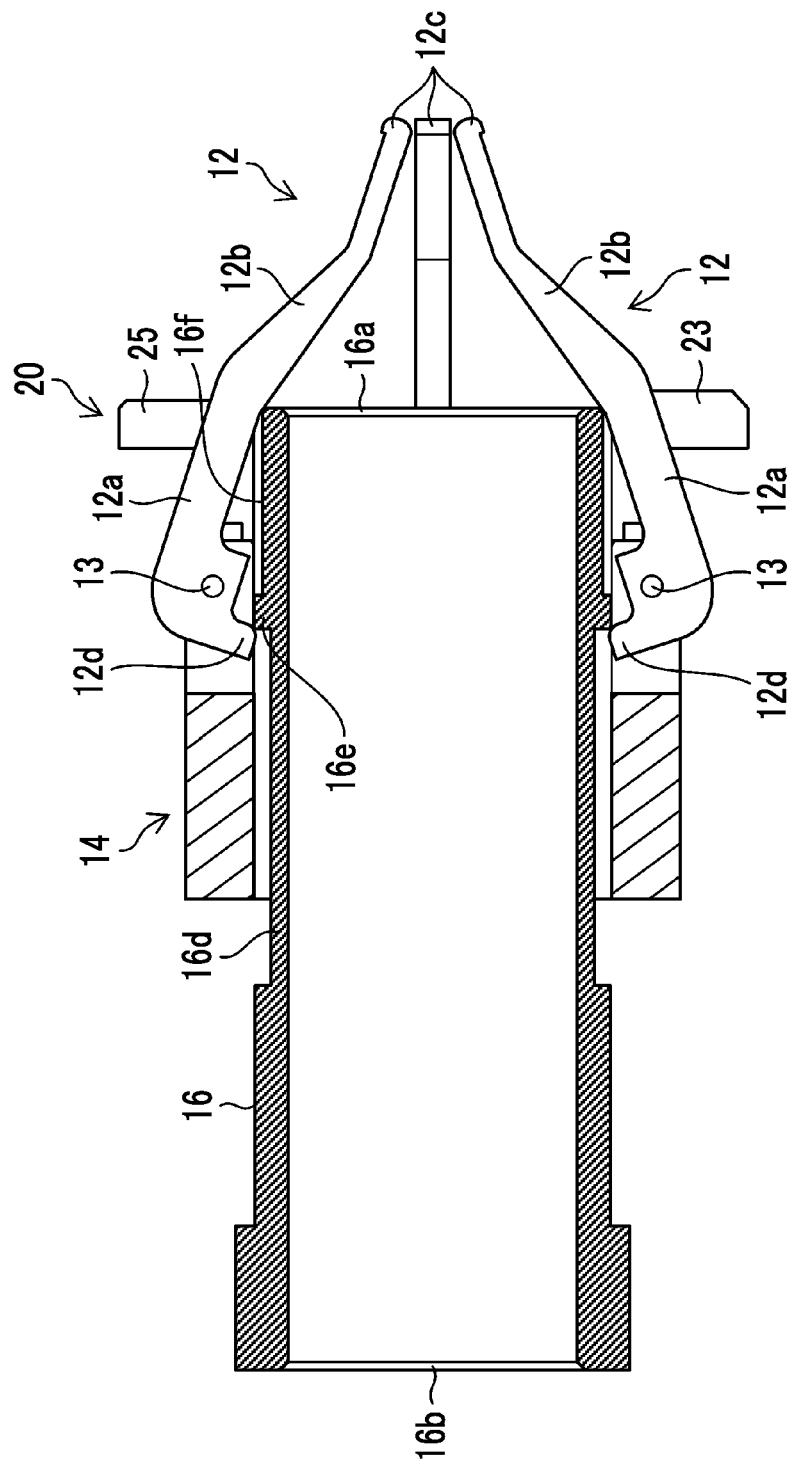
FIG. 5 is a cross-sectional view showing the arm in a second state.

Next, switching between the first state in which the diameter of the receiving portion 12c is expanded and the second state in which the diameter of the receiving portion 12c is reduced will be described. FIG. 4 is a cross-sectional view showing the arm in the first state, and FIG. 5 is a cross-sectional view showing the arm in the second state. In FIGS. 4 and 5, the grip 18 is not shown.

As shown in FIGS. 4 and 5, the arm holding boss 14 includes an attachment shaft 13, and the arm 12 is swingably attached to the arm holding boss 14 via the attachment shaft 13.

The arm 12 includes a swing restricting protrusion 12d that restricts swing. The outer peripheral surface of the movable sleeve 16 is provided with a slide groove 16d, a peripheral protrusion portion 16e, and a receiving portion groove 16f from the proximal end side to the distal end side. The swing restricting protrusion 12d is provided near an attachment end portion of the arm 12. Since the swing restricting protrusion 12d comes into contact with a bottom surface of the slide groove 16d of the movable sleeve 16, a force acts on the receiving portion 12c toward the outer peripheral surface with the attachment shaft 13 as a fulcrum. Since the receiving portion 12c comes into contact with the outer peripheral surface (receiving portion groove 16f) of the movable sleeve 16, the receiving portion 12c is prevented from being separated from the outer peripheral surface of the movable sleeve 16.

The slide groove 16d is formed on the outer peripheral surface of the movable sleeve 16 along the axial direction Ax. In a case where the movable sleeve 16 relatively moves inside the arm holding boss 14, the swing restricting protrusion 12d is in sliding contact with the slide groove 16d. Therefore, the arm 12 does not swing, and the receiving portion 12c is held in the diameter-expanded state parallel to the axial direction Ax.

The peripheral protrusion portion 16e is formed on the distal end side of the slide groove 16d. In a case where the movable sleeve 16 is moved to the proximal end side to be in the second state shown in FIG. 5, the swing restricting protrusion 12d rides on the peripheral protrusion portion 16e. Then, the contact between the receiving portion 12c and the receiving portion groove 16f is released. As a result, the arm 12 rotates about the attachment shaft 13, and the receiving portion 12c is in the diameter-reduced state.

By operating the operation lever 36, the movable sleeve 16 is relatively moved to the distal end side, and the swing restricting protrusion 12d descends from the peripheral protrusion portion 16e. In a case where the swing restricting protrusion 12d is in sliding contact with the slide groove 16d and is further moved, the first state shown in FIG. 4 is reached. Since the receiving portion 12c comes into contact with the receiving portion groove 16f, the receiving portion 12c is in the diameter-expanded state. By operating the operation lever 36, it is possible to easily switch between the diameter-expanded state of the receiving portion 12c and the diameter-reduced state of the receiving portion 12c.

Figure 6:
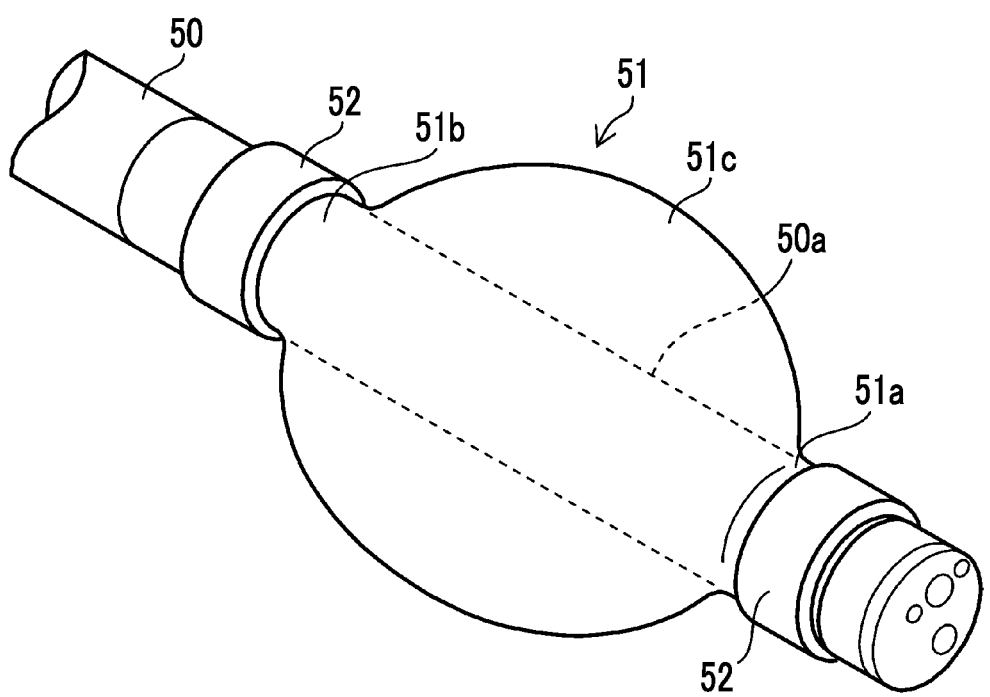
FIG. 6 is a perspective view showing a state in which a rubber band and a balloon are attached to an endoscope insertion portion.

Next, an example of a target object using the mounting device 10 will be described. FIG. 6 is a perspective view showing a state in which the rubber band and the balloon are attached to the endoscope insertion portion. As shown in FIG. 6, the mounting device 10 (not shown) is used in a case of mounting the balloon 51 and/or the rubber band 52 for attaching the balloon, which is an example of the elastic tubular member, to a distal end 50a of the endoscope insertion portion 50 as the rod-like body. The balloon 51 is made of an elastic material such as silicon rubber. The balloon 51 is formed in a substantially tubular shape of which both end portions are constricted, that is, in a tubular shape including end portions 51a and 51b having a small diameter and a bulging central portion 51c. The balloon 51 is disposed at a predetermined mounting position by inserting the endoscope insertion portion 50 therethrough. The balloon 51 disposed at the predetermined mounting position is fixed to the endoscope insertion portion 50 by fixing the end portions 51a and 51b with the rubber bands 52.

The end portions 51a and 51b of the balloon 51 or the rubber bands 52 have a smaller inner diameter than an outer diameter of the endoscope insertion portion 50 in a natural state of not being expanded. Therefore, in this state, the endoscope insertion portion 50 cannot be inserted. Therefore, the mounting device 10 is used to expand the diameters of the end portions 51a and 51b of the balloon 51 or the rubber bands 52 to facilitate the insertion of the endoscope insertion portion 50. Accordingly, the end portions 51a and 51b of the balloon 51 or the rubber bands 52 are accurately mounted to the mounting position of the endoscope insertion portion 50.

Next, a case where the rubber band 52 is mounted to the endoscope insertion portion 50 by using the mounting device 10 will be described with reference to FIGS. 7 to 12.

Figure 7:
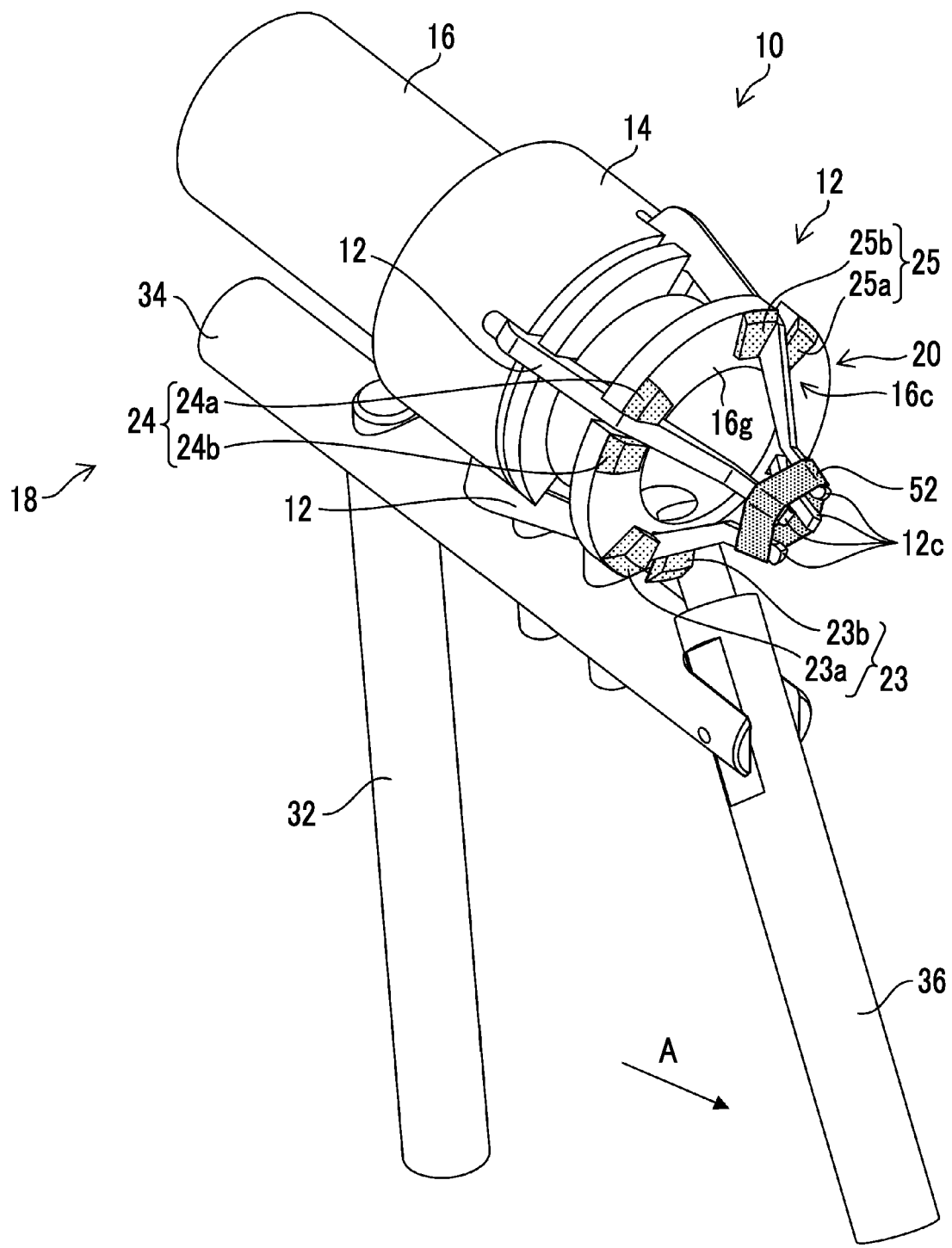
FIG. 7 is a view for explaining a mounting procedure of the elastic tubular member using the mounting device.

First, as shown in FIG. 7, in a case where the operation lever 36 is pushed in a direction of an arrow A to move the movable sleeve 16 toward the proximal end side, the movable sleeve 16 moves inside the arm holding boss 14. As a result, the state of the mounting device 10 changes from the first state (initial state) to the second state. The four receiving portions 12c protrude from a distal end of the flange portion 20, and the receiving portions 12c are brought into a diameter-reduced state by the engagement between the swing restricting protrusion 12d and the peripheral protrusion portion 16e. The rubber band 52 is mounted to the receiving portions 12c in the diameter-reduced state, and the receiving portions 12c support an inner peripheral surface of the rubber band 52.

Figure 8:
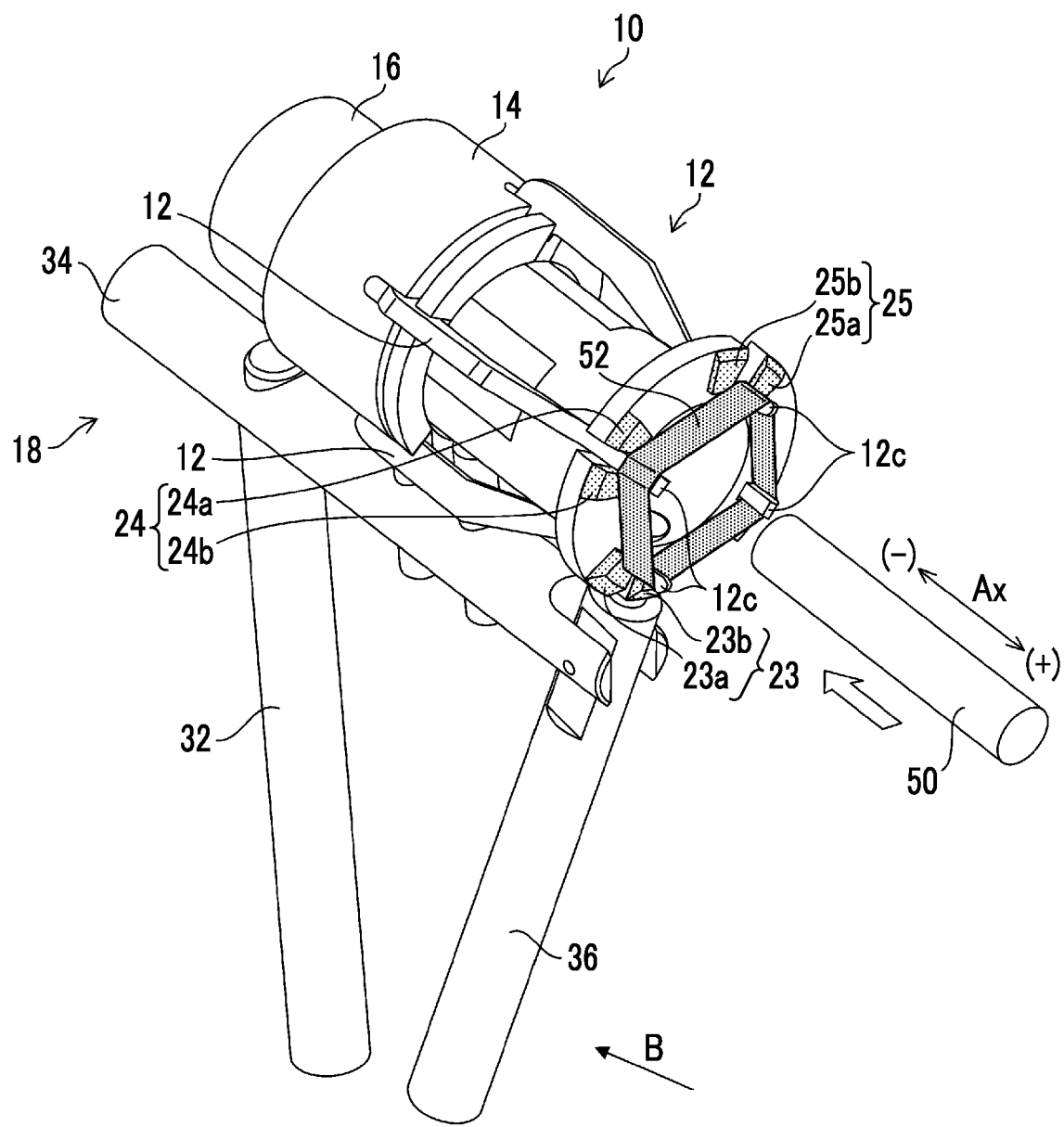
FIG. 8 is a view for explaining a mounting procedure of the elastic tubular member using the mounting device.

Next, as shown in FIG. 8, the movable sleeve 16 is moved to the distal end side by operating the operation lever 36 in a direction of an arrow B. Accordingly, the mounting device 10 is switched from the second state to the first state. By engaging the arm 12 with the movable sleeve 16, the arm 12 rotates in an opening direction, and the four receiving portions 12c are in the diameter-expanded state. Accordingly, the diameter of the rubber band 52 is expanded by the four receiving portions 12c. The diameter of the rubber band 52 is expanded so as to have a quadrangular shape when viewed from the distal end side along the axial direction Ax. Since the diameter of the rubber band 52 is expanded to a size that exceeds the outer diameter of the endoscope insertion portion 50, the endoscope insertion portion 50 can be inserted into the movable sleeve 16. In this diameter-expanded position, the distal end 50a of the endoscope insertion portion 50 can be inserted into the movable sleeve 16, and the rubber band 52 can be relatively moved to a band fastening position of the endoscope insertion portion 50.

Figure 9:
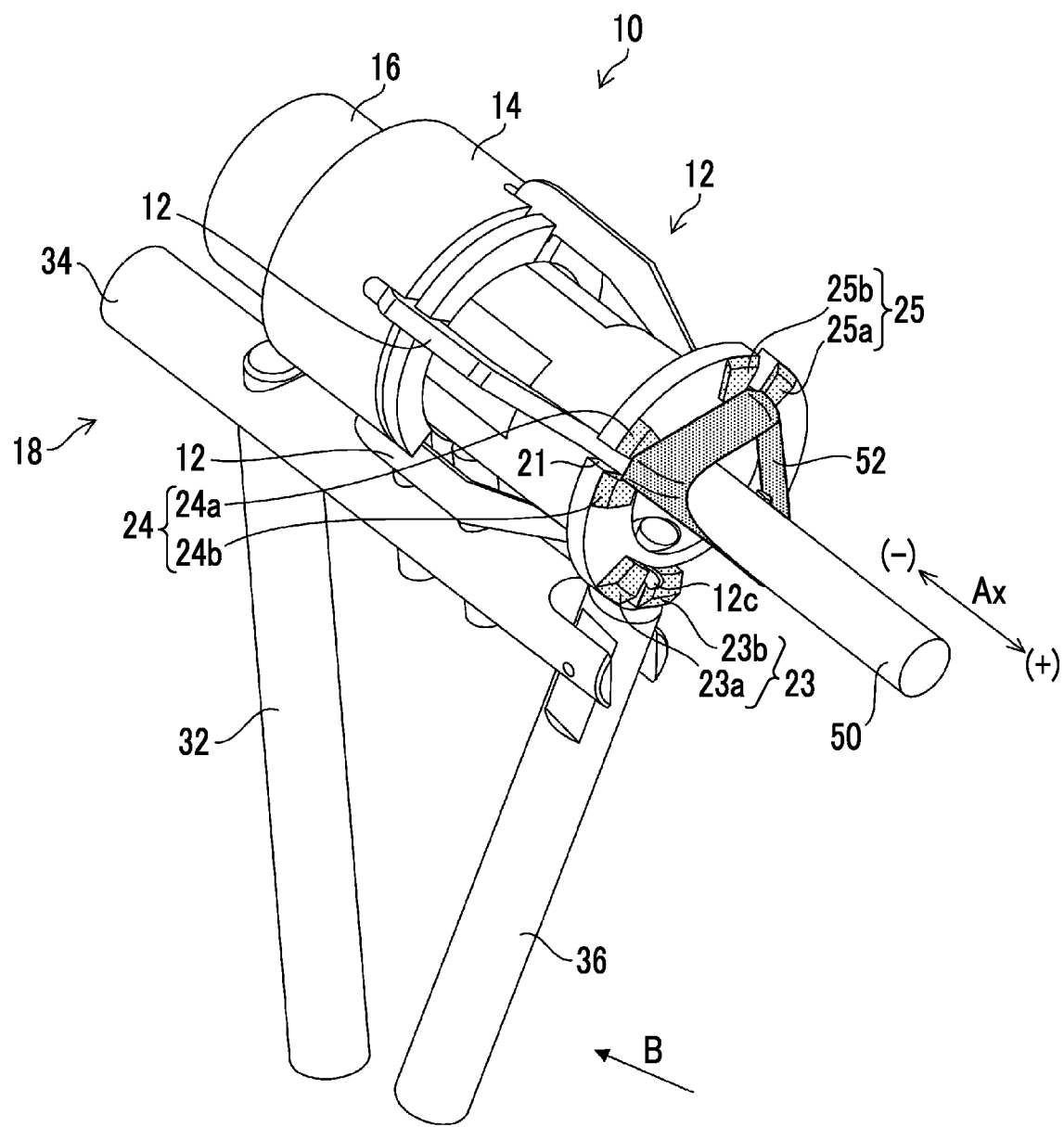
FIG. 9 is a view for explaining a mounting procedure of the elastic tubular member using the mounting device.

By further operating the operation lever 36 in the direction of the arrow B, the movable sleeve 16 is moved to the distal end side. The pushing portion 23 having the highest pushing height formed in the flange portion 20 pushes one corner region at a corresponding position among four corner regions of the rubber band 52 whose diameters are expanded. Then, as shown in FIG. 9, the pushing portion 23 pushes the rubber band 52 from the receiving portion 12c. The pushed rubber band 52 disengages from the receiving portion 12c and moves to the endoscope insertion portion 50. In this diameter-expanded position, the rubber band 52 is supported by the three receiving portions 12c and the diameter is expanded.

Figure 10:
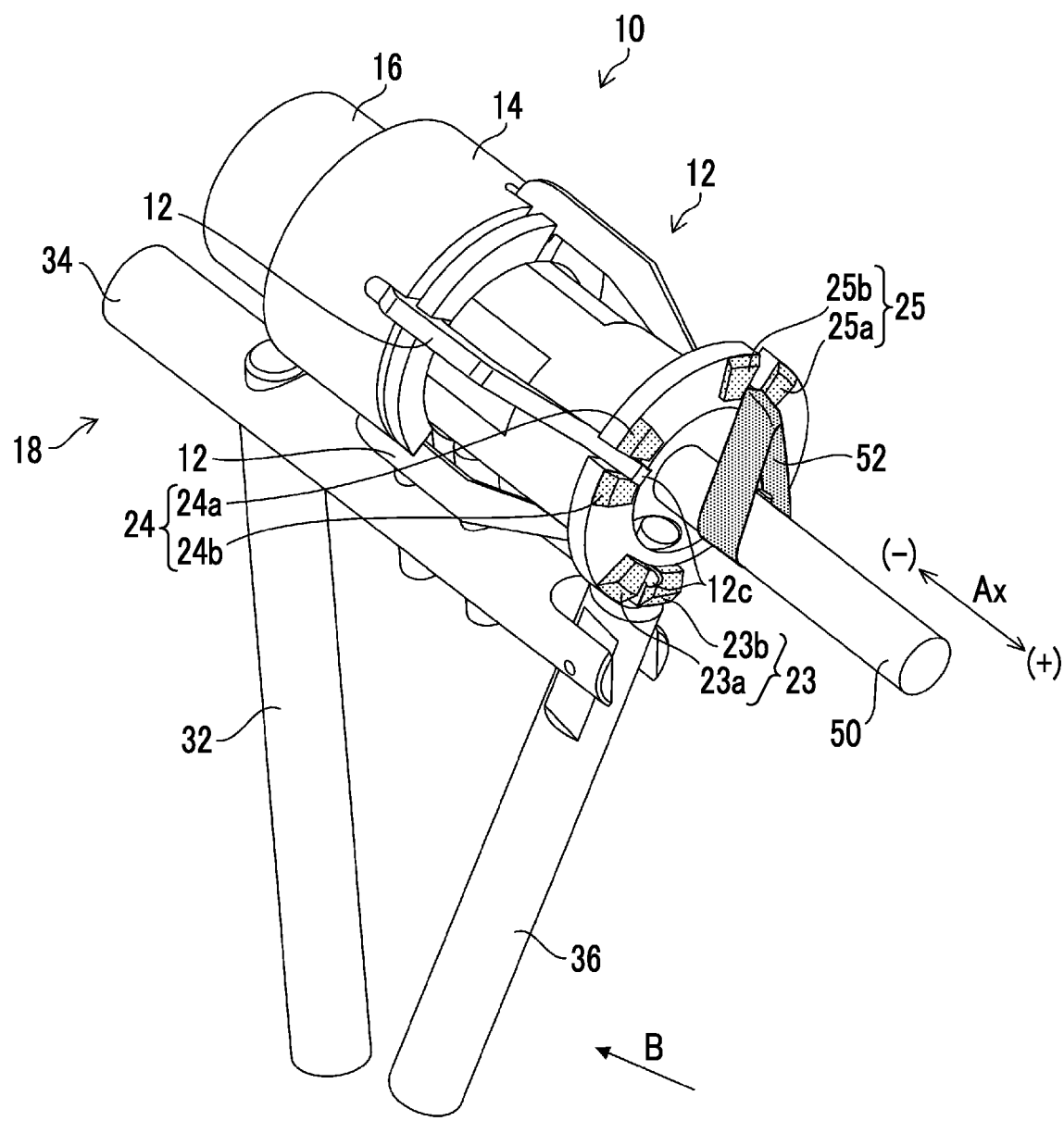
FIG. 10 is a view for explaining a mounting procedure of the elastic tubular member using the mounting device.

By further operating the operation lever 36 in the direction of the arrow B, the movable sleeve 16 is moved to the distal end side. The pushing portion 24 having the second pushing height pushes one corner region at a corresponding position among three corner regions of the rubber band 52 whose diameters are expanded. Then, as shown in FIG. 10, the pushing portion 24 pushes the rubber band 52 from the receiving portion 12c. The pushed rubber band 52 disengages from the receiving portion 12c and moves to the endoscope insertion portion 50. In this diameter-expanded position, the rubber band 52 is supported by two receiving portions 12c and the diameter thereof is expanded.

Figure 11:
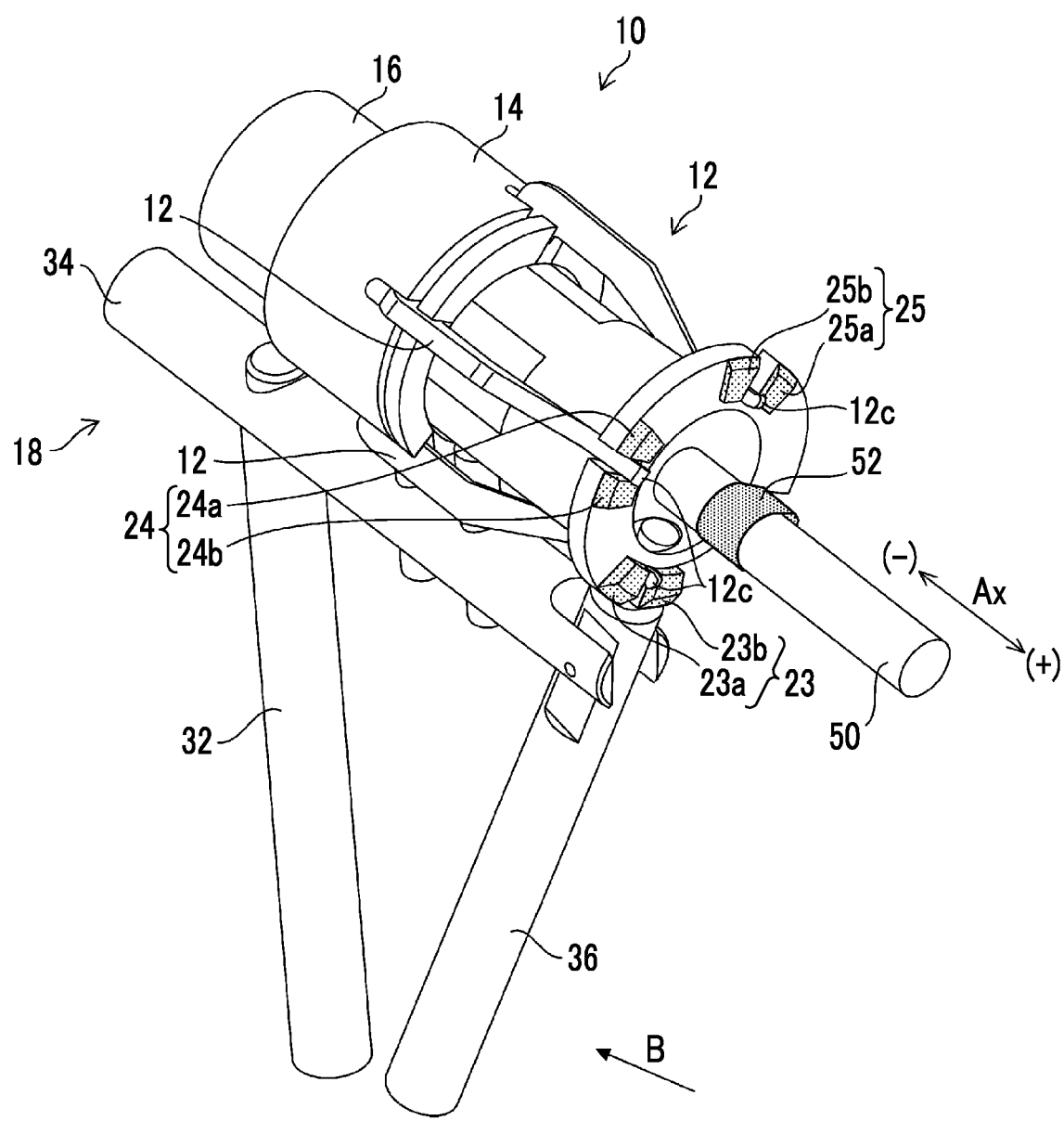
FIG. 11 is a view for explaining a mounting procedure of the elastic tubular member using the mounting device.

By further operating the operation lever 36 in the direction of the arrow B, the movable sleeve 16 is moved to the distal end side. The pushing portion 25 having the third pushing height pushes one corner region at a corresponding position out of two corner regions of the rubber band 52 whose diameters are expanded by the receiving portion 12c. Then, as shown in FIG. 11, the pushing portion 25 pushes the rubber band 52 from the receiving portion 12c. The pushed rubber band 52 moves to the endoscope insertion portion 50. In this diameter-expanded position, the rubber band 52 is supported by one receiving portion 12c, and the diameter thereof is expanded.

Figure 12:
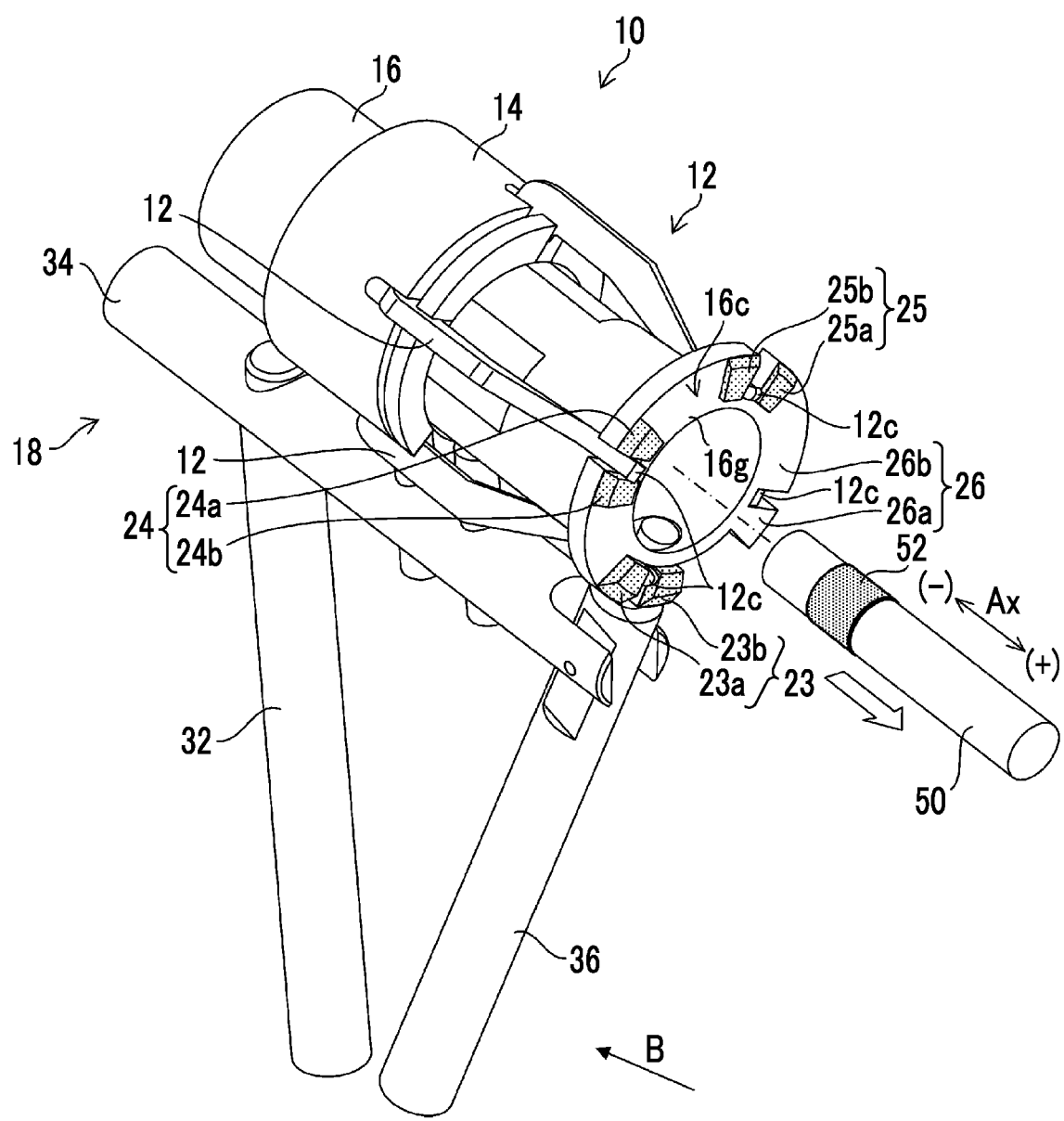
FIG. 12 is a view for explaining a mounting procedure of the elastic tubular member using the mounting device.

By further operating the operation lever 36 in the direction of the arrow B, the movable sleeve 16 is moved to the distal end side. The pushing portion 26 having the lowest pushing height pushes the last corner region of the rubber band 52 whose diameter is expanded by the receiving portion 12c. Then, as shown in FIG. 12, the pushing portion 26 pushes the rubber band 52 from the receiving portion 12c. As a result, the rubber band 52 is disengaged from all the receiving portions 12c, and the pushed rubber band 52 moves to the endoscope insertion portion 50. Therefore, the rubber band 52 can be fastened to the endoscope insertion portion 50.

As described with reference to FIGS. 7 to 12, in this example, the rubber band 52 is disengaged from the four receiving portions 12c that support the rubber band 52 with a time lag in order from the receiving portions 12c for each corner region. Since the rubber band 52 is gradually disengaged from the four receiving portions 12c, an impact in disengaging the rubber band 52 can be reduced, and the rubber band 52 can be stably disengaged from the receiving portions 12c.

In addition, since the pushing portions 23, 24, 25, and 26 push the respective corner regions of the rubber band 52 whose diameter is expanded, it is possible to suppress twisting of the rubber band 52.

Further, in this example, a pair of individual pushing portions 23a, 23b constituting the pushing portion 23 can push the corner region of the rubber band 52 held by the receiving portion 12c from both sides of the receiving portion 12c. Accordingly, the rubber band 52 can be stably disengaged from the receiving portion 12c. The pushing portion 24 is composed of a pair of individual pushing portions 24a and 24b, the pushing portion 25 is composed of a pair of individual pushing portions 25a and 25b, and the pushing portion 26 is composed of a pair of individual pushing portions 26a and 26b. Therefore, in the same manner, the rubber band 52 can be stably disengaged from the receiving portion 12c. However, shapes of the pushing portions 23, 24, 25, and 26 are not particularly limited as long as the rubber band 52, which is the elastic tubular member, can be pushed from the receiving portions 12c. Each of the pushing portions 23, 24, 25, and 26 may be composed of one member, or may be composed of three or more individual pushing portions.

Further, by changing the arrangement and the pushing heights of the pushing portions 23, 24, 25, and 26 within the flange portion 20, the order of pushing the rubber band 52 from the receiving portion 12c and the time lag can be easily adjusted. For example, the pushing portion 23 having the highest pushing height may be disposed at a position different from a position shown in FIG. 1 or the like, and the remaining pushing portions 24, 25, and 26 may be disposed along a circumferential direction of the flange portion 20.

MODIFICATION EXAMPLES

Hereinafter, modification examples of the embodiment will be described.

First Modification Example

Figure 13:
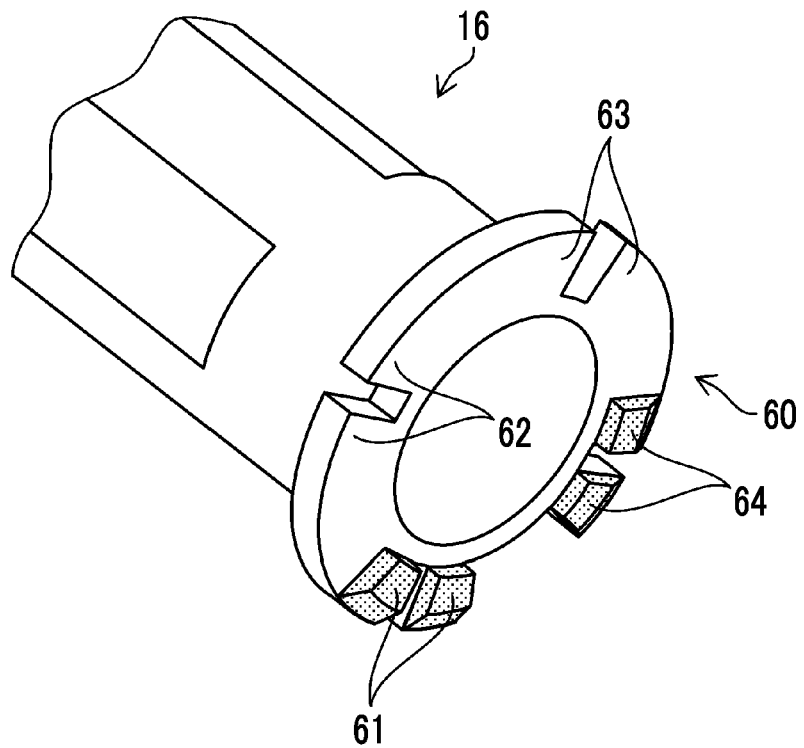
FIG. 13 is a view for explaining a first modification example.

FIG. 13 is a view for explaining a first modification example. In FIG. 13, the same parts as those in the above-described embodiment are designated by the same references, and the description thereof will not be repeated. In the following description, only flange portions 60, 70, 80, and 90 are illustrated.

The flange portion 60 of the first modification example includes four pushing portions 61, 62, 63, and 64, which are disposed in order in a circumferential direction. The pushing portion 61 and the pushing portion 64 have the same pushing height, and the pushing portion 62 and the pushing portion 63 have the same pushing height. That is, the flange portion 60 is composed of two types of pushing portions having pushing heights (a group of the pushing portions 61 and 64 and a group of the pushing portions 62 and 63). In the first modification example, the pushing portion 61 and the pushing portion 64 having the same pushing height are disposed side by side in a circumferential direction. In addition, the remaining other two pushing portions 62 and 63 are disposed in a circumferential direction.

In the first modification example, first, the pushing portion 61 and the pushing portion 64 push the rubber band 52 (not shown) from the receiving portion 12c (not shown). As a result, two corner regions of the rubber band 52 are disengaged from the receiving portions 12c. The pushed rubber band 52 moves to the endoscope insertion portion 50. The rubber band 52 is supported by the remaining two receiving portions 12c, and the diameter thereof is expanded.

Next, the other two pushing portions 62 and 63 push the rubber band 52 from the remaining two receiving portions 12c. As a result, the remaining two corner regions of the rubber band 52 are disengaged from the receiving portions 12c, and the pushed rubber band 52 moves to the endoscope insertion portion 50. Therefore, the rubber band 52 can be fastened to the endoscope insertion portion 50. In the first modification example, since the rubber band 52 is disengaged from the receiving portions 12c at two locations at a time, the impact can be reduced and the rubber band 52 can be stably disengaged from the receiving portions 12c.

Second Modification Example

Figure 14:
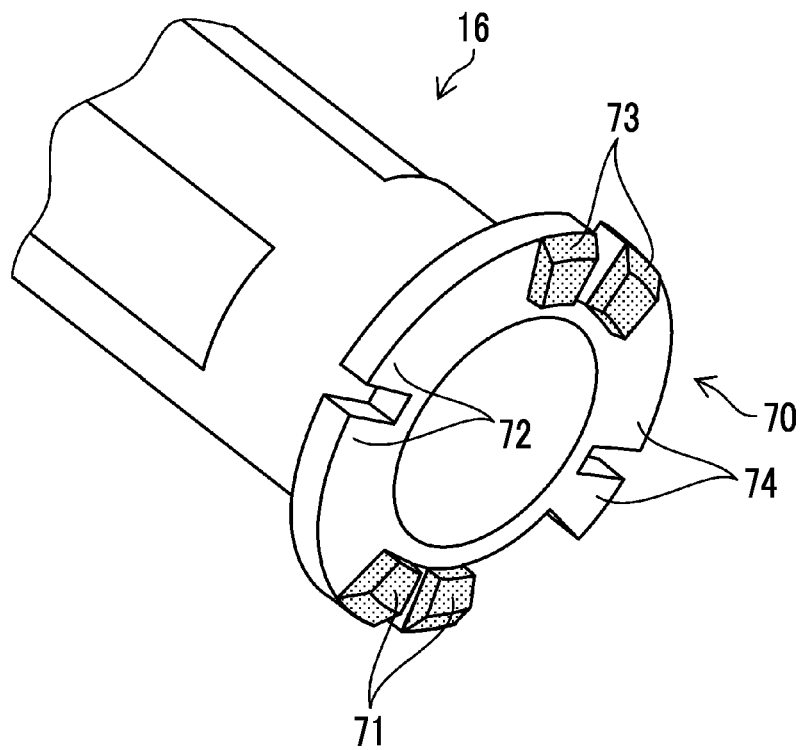
FIG. 14 is a view for explaining a second modification example.

FIG. 14 is a view for explaining a second modification example. In FIG. 14, the same parts as those in the above-described embodiment are designated by the same references, and the description thereof will not be repeated.

The flange portion 70 of the second modification example includes four pushing portions 71, 72, 73, and 74, which are disposed in order in a circumferential direction. The pushing portion 71 and the pushing portion 73 have the same pushing height, and the pushing portion 72 and the pushing portion 74 have the same pushing height. That is, the flange portion 70 is composed of two types of pushing portions having pushing heights (a group of the pushing portions 71 and 73 and a group of the pushing portions 72 and 74). In the second modification example, the four pushing portions 71, 72, 73, and 74 are alternately disposed in order of different heights along a circumferential direction.

In the second modification example, first, the pushing portion 71 and the pushing portion 73 push the rubber band 52 (not shown) from the receiving portions 12c (not shown). As a result, two corner regions of the rubber band 52 are disengaged from the receiving portions 12c. Next, the other two pushing portions 72 and 74 push the rubber band 52 from the remaining two receiving portions 12c. As a result, the remaining two corner regions of the rubber band 52 are disengaged from the receiving portions 12c. The rubber band 52 is disengaged from the four receiving portions 12c, and the rubber band 52 can be fastened to the endoscope insertion portion 50. In the second modification example, since the rubber band 52 is disengaged from the receiving portions 12c at two locations at a time as in the first modification example, the impact can be reduced and the rubber band 52 can be stably disengaged from the receiving portions 12c. The order of disengaging the rubber band 52 from the receiving portions 12c is different between the second modification example and the first modification example. The order of disengaging the rubber band 52 from the receiving portions 12c can be appropriately changed in consideration of the characteristics of the rubber band 52, the outer diameter of the endoscope insertion portion 50, and the like.

Third Modification Example

Figure 15:
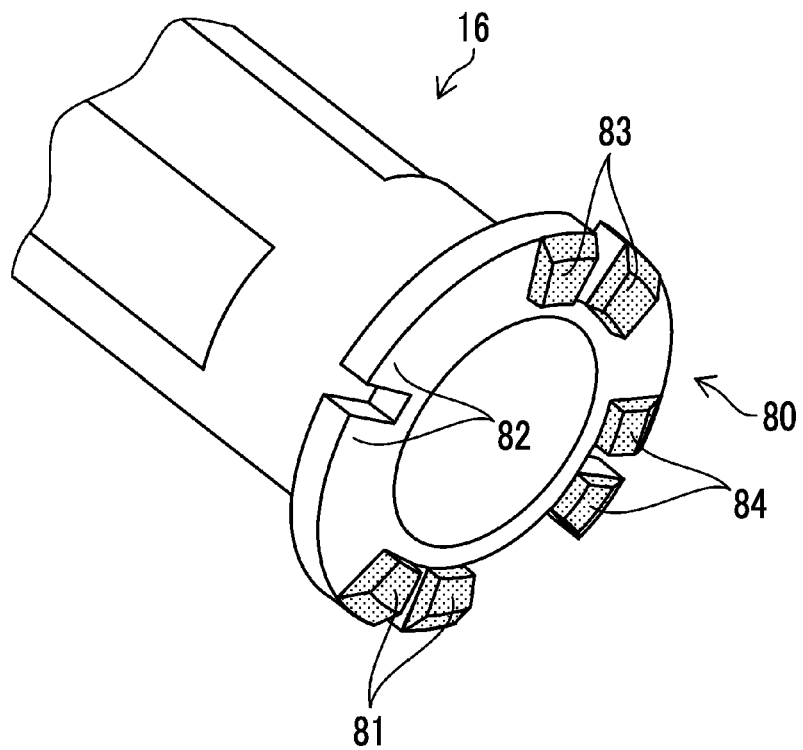
FIG. 15 is a view for explaining a third modification example.

FIG. 15 is a view for explaining a third modification example. In FIG. 15, the same parts as those in the above-described embodiment are designated by the same references, and the description thereof will not be repeated.

The flange portion 80 of the third modification example includes four pushing portions 81, 82, 83, and 84, which are disposed in order in a circumferential direction. The pushing portion 81, the pushing portion 83, and the pushing portion 84 have the same pushing height, and the remaining pushing portion 82 has a different pushing height. That is, the flange portion 80 is composed of two types of pushing portions having pushing heights (a group of the pushing portion 81, the pushing portion 83, and the pushing portion 84 and a group of the pushing portions 82).

In the third modification example, first, the pushing portion 81, the pushing portion 83, and the pushing portion 84 push the rubber band 52 (not shown) from the receiving portions 12c (not shown). As a result, three corner regions of the rubber band 52 are disengaged from the receiving portions 12c. Next, the remaining one pushing portion 82 pushes the rubber band 52 from the remaining one receiving portion 12c. As a result, the remaining corner region of the rubber band 52 is disengaged from the receiving portion 12c. The rubber band 52 is disengaged from the four receiving portions 12c, and the rubber band 52 can be fastened to the endoscope insertion portion 50.

In the third modification example, first, three locations of the rubber band 52 are disengaged from the receiving portion 12c, and then the remaining one location is disengaged from the receiving portion 12c. Therefore, the impact can be reduced, and the rubber band 52 can be stably disengaged from the receiving portions 12c compared to a case where four locations of the rubber band 52 are disengaged from the receiving portions 12c at the same time.

In this example, the pushing heights of the pushing portions 81, 83, and 84 are set to be higher than the pushing height of the pushing portion 82. On the contrary, the pushing height of the pushing portion 82 may be set to be higher than the pushing heights of the pushing portions 81, 83, and 84. In this case, first, one location of the rubber band 52 is disengaged from the receiving portion 12c, and then the remaining three locations are disengaged from the receiving portions 12c.

Fourth Modification Example

Figure 16:
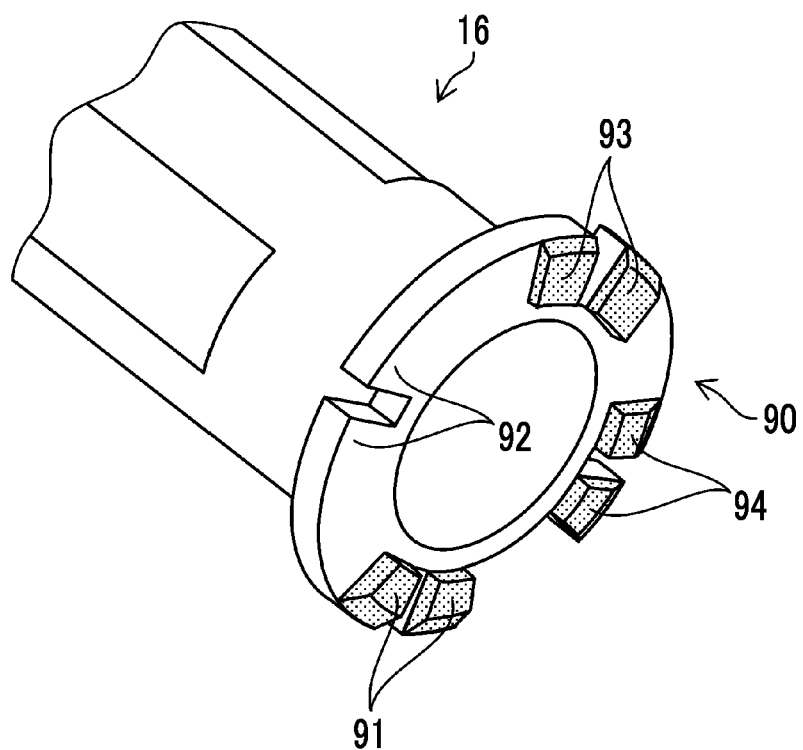
FIG. 16 is a view for explaining a fourth modification example.

FIG. 16 is a view for explaining a fourth modification example. In FIG. 16, the same parts as those in the above-described embodiment are designated by the same references, and the description thereof will not be repeated.

The flange portion 90 of the fourth modification example includes four pushing portions 91, 92, 93, and 94, which are disposed in order in a circumferential direction. The pushing portion 91 and the pushing portion 94 have the same first pushing height. The pushing portion 92 has a second pushing height, and the pushing portion 93 has a third pushing height. The first pushing height, the second pushing height, and the third pushing height are different from each other. That is, the flange portion 90 is composed of three types of pushing portions having pushing heights (a group of the pushing portion 91 and the pushing portion 94, a group of the pushing portion 92, and a group of the pushing portion 93).

In the fourth modification example, first, the pushing portion 91 and the pushing portion 94 push the rubber band 52 (not shown) from the receiving portions 12c (not shown). As a result, two corner regions of the rubber band 52 are disengaged from the receiving portions 12c. Next, the pushing portion 93 pushes one corner region of the rubber band 52 from the receiving portion 12c. Finally, the remaining one pushing portion 92 pushes the last corner region of the rubber band 52 from the remaining one receiving portion 12c. The rubber band 52 is disengaged from the four receiving portions 12c, and the rubber band 52 can be fastened to the endoscope insertion portion 50.

In the fourth modification example, two locations of the rubber band 52 are disengaged from the receiving portions 12c, then one location is disengaged from the receiving portion 12c, and finally the remaining one location is disengaged from the receiving portion 12c. Therefore, the impact in disengaging the rubber band 52 can be reduced, and the rubber band 52 can be stably disengaged from the receiving portions 12c. In addition, as long as the four pushing portions 91, 92, 93, and 94 are composed of three types of pushing portions having pushing heights, the arrangement thereof and the pushing height of each pushing portion can be appropriately set.

Other Preferred Modification Example

In this example, a case where the mounting device includes the four arms and the flange portion including the four pushing portions has been described, but the present invention is not limited thereto. The mounting device may have at least three arms and at least three pushing portions and may have a configuration in which at least one pushing portion has a different pushing height from the other pushing portions.

For example, the number of the arms and the pushing portions can be appropriately selected, such as a combination of three arms and three pushing portions, or a combination of five arms and five pushing portions.

The three or more pushing portions all may have different pushing heights, or the three or more pushing portions may be divided into a plurality of groups and the pushing heights may be different for each group. In a case where all the three or more pushing portions have different pushing heights, it is preferable to dispose the three or more pushing portions in order of height in a circumferential direction of the flange portion. The elastic tubular member can be sequentially disengaged from the receiving portion along a circumferential direction of the flange portion. With the above-described configuration, twisting of the elastic tubular member can be suppressed, and the elastic tubular member can be stably disengaged from the receiving portions.

EXPLANATION OF REFERENCES

10: mounting device
12: arm
12a: arm body portion
12b: arm intermediate portion
12c: receiving portion
12d: swing restricting protrusion
13: attachment shaft
14: arm holding boss
14a: opening 14b: opening
15: arm holding groove
16: movable sleeve
16a: opening
16b: opening
16c: distal end surface
16d: slide groove
16e: peripheral protrusion portion
16f: receiving portion groove
16g: peripheral edge surface
17: engagement hole
18: grip
20: flange portion
21: groove portion
22: cutout
23: pushing portion
23a: individual pushing portion
23b: individual pushing portion
24: pushing portion
24a: individual pushing portion
24b: individual pushing portion
25: pushing portion
25a: individual pushing portion
25b: individual pushing portion
26: pushing portion
26a: individual pushing portion
26b: individual pushing portion
32: first rod member
34: second rod member
36: operation lever
36a: distal end portion
36b: spring locking hole
36c: rear end portion
38: support member
40: attachment screw
42: attachment portion
42a: spring locking hole
44: attachment shaft
48: torsion spring
48a: end portion
48b: end portion
50: endoscope insertion portion
50a: distal end
51: balloon
51a: end portion
51b: end portion
51c: central portion
52: rubber band
60: flange portion
61: pushing portion
62: pushing portion
63: pushing portion
64: pushing portion
70: flange portion
71: pushing portion
72: pushing portion
73: pushing portion
74: pushing portion
80: flange portion
81: pushing portion
82: pushing portion
83: pushing portion
84: pushing portion
90: flange portion
91: pushing portion
92: pushing portion
93: pushing portion
94: pushing portion
Ax: axial direction

What is claimed is:

1. A mounting device for an elastic tubular member, which expands a diameter of the elastic tubular member larger than an outer diameter of a rod-like body as an attachment target to mount the elastic tubular member on the rod-like body from an outside, the mounting device comprising:
a movable sleeve into which the rod-like body is capable of being inserted;
a movable sleeve holding member that movably holds the movable sleeve in an axial direction;
three or more arms, which are arranged on an outer periphery of the movable sleeve apart from each other in a circumferential direction and parallel to the axial direction and of which one end portion is attached to the movable sleeve holding member such that the arms are swingable in a radial direction of the movable sleeve;
receiving portions each formed on the other end portion of each arm, which receive an inner peripheral surface of the elastic tubular member and are brought into a diameter-reduced state in which the elastic tubular member is capable of being set and a diameter-expanded state in which the elastic tubular member is capable of being mounted to the rod-like body due to swinging of the arms;
a flange portion that is provided on a distal end side of the movable sleeve into which the rod-like body is inserted and that forms a distal end surface of the movable sleeve and allows passage of the arms;
three or more pushing portions for pushing the elastic tubular member, the pushing portion being formed on the distal end surface for each of positions of the arms, and at least one pushing portion having a height in a pushing direction different from that of the other pushing portion; and
a shift mechanism that moves the movable sleeve relative to the movable sleeve holding member to swing the arm by engagement between the movable sleeve and the arm, brings the receiving portions into the diameter-expanded state from the diameter-reduced state, and thereafter pushes the elastic tubular member from the receiving portions by the pushing portions in order of the heights of the pushing portions.

2. The mounting device for an elastic tubular member according to claim 1, wherein the three or more pushing portions all have different heights in the pushing direction.

3. The mounting device for an elastic tubular member according to claim 2, wherein the three or more pushing portions are disposed in order of the heights along a circumferential direction of the flange portion.

4. The mounting device for an elastic tubular member according to claim 1, wherein a groove portion defined by the flange portion and extending in a radial direction of the flange portion allows passage of the arm.

5. The mounting device for an elastic tubular member according to claim 4, wherein each of the three or more pushing portions is composed of a pair of individual pushing portions disposed on both sides of the groove portion.

6. The mounting device for an elastic tubular member according to claim 1, wherein the three or more arms are composed of four arms, and
the three or more pushing portions are composed of four pushing portions.

7. The mounting device for an elastic tubular member according to claim 6, wherein the four pushing portions are composed of two types of pushing portions in which only one pushing portion has a different height in the pushing direction from other three pushing portions.

8. The mounting device for an elastic tubular member according to claim 6, wherein the four pushing portions are composed of three types of pushing portions in which one pushing portion, two other pushing portions, and a remaining one pushing portion have different heights in the pushing direction.

9. The mounting device for an elastic tubular member according to claim 6, wherein the four pushing portions are composed of two types of pushing portions in which two pushing portions have different heights in the pushing direction from other two pushing portions.

10. The mounting device for an elastic tubular member according to claim 9, wherein among the four pushing portions, the two pushing portions are disposed side by side in a circumferential direction, and the other two pushing portions are disposed in the circumferential direction.

11. The mounting device for an elastic tubular member according to claim 9, wherein the four pushing portions are alternately disposed in order of different heights along a circumferential direction of the flange portion.

12. The mounting device for an elastic tubular member according to claim 11, wherein the four pushing portions are disposed in order of the heights along the circumferential direction of the flange portion.

13. The mounting device for an elastic tubular member according to claim 6, wherein the four pushing portions all have different heights in the pushing direction.

14. The mounting device for an elastic tubular member according to claim 1, wherein the rod-like body is an endoscope insertion portion, and the elastic tubular member is a balloon or a rubber band for attaching the balloon to be attached to the endoscope insertion portion.

15. The mounting device for an elastic tubular member according to claim 1, wherein the arm has at the one end portion thereof a swing restricting protrusion that comes into contact with an outer peripheral surface of the movable sleeve to restrict swing, and
the movable sleeve has a peripheral protrusion portion on which the swing restricting protrusion rides to bring the receiving portion into the diameter-reduced state.

16. The mounting device for an elastic tubular member according to claim 1, wherein the flange portion and the three or more pushing portions are composed of an integrally molded product.

17. A mounting method for an elastic tubular member, which expands a diameter of the elastic tubular member larger than an outer diameter of a rod-like body as an attachment target to mount the elastic tubular member on the rod-like body from an outside, the method comprising:

by using a mounting device for an elastic tubular member including:

a movable sleeve into which the rod-like body is capable of being inserted;

a movable sleeve holding member that movably holds the movable sleeve in an axial direction;

three or more arms, which are arranged on an outer periphery of the movable sleeve apart from each other in a circumferential direction and parallel to the axial direction and of which one end portion is attached to the movable sleeve holding member such that the arms are swingable in a radial direction of the movable sleeve;

receiving portions each formed on the other end portion of each arm, which receive an inner peripheral surface of the elastic tubular member and are brought into a diameter-reduced state in which the elastic tubular member is capable of being set and a diameter-expanded state in which the elastic tubular member is capable of being mounted to the rod-like body due to swinging of the arms;

a flange portion that is provided on a distal end side of the movable sleeve into which the rod-like body is inserted and that forms a distal end surface of the movable sleeve and allows passage of the arms; and three or more pushing portions for pushing the elastic tubular member, the pushing portion being formed on the distal end surface for each of positions of the arms, and at least one pushing portion having a height in a pushing direction different from that of the other pushing portion, moving the movable sleeve relative to the movable sleeve holding member to swing the arm by engagement between the movable sleeve and the arm, bringing the receiving portions into the diameter-expanded state from the diameter-reduced state, and thereafter pushing the elastic tubular member from the receiving portions by the pushing portions in order of the heights of the pushing portions.

\* \* \* \* \*